(12) United States Patent
Tuli

(10) Patent No.: US 7,360,173 B2
(45) Date of Patent: Apr. 15, 2008

(54) PORTABLE HIGH SPEED INTERNET DEVICE INTEGRATING CELLULAR TELEPHONE AND PALM TOP COMPUTER

(76) Inventor: Raja Tuli, 1155 Rene Levesque West, #3500, Montreal, QC (CA) H3B 3T6

( * ) Notice: Subject to any disclaimer, the term of this patent is extended or adjusted under 35 U.S.C. 154(b) by 789 days.

(21) Appl. No.: 10/448,700

(22) Filed: May 29, 2003

(65) Prior Publication Data

US 2003/0197725 A1 Oct. 23, 2003

Related U.S. Application Data

(60) Division of application No. 09/504,807, filed on Feb. 16, 2000, now Pat. No. 6,633,314, which is a continuation-in-part of application No. 09/496,172, filed on Feb. 2, 2000, now Pat. No. 7,068,381.

(51) Int. Cl.
*G06F 13/00* (2006.01)
*G06F 15/00* (2006.01)
(52) U.S. Cl. .................. 715/851; 715/765
(58) Field of Classification Search ........... 715/744, 715/848, 762–765, 851–854; 455/72, 566; 709/210, 217
See application file for complete search history.

(56) References Cited

U.S. PATENT DOCUMENTS

| | | |
|---|---|---|
| 4,899,394 A | 2/1990 | Lee |
| 5,161,213 A | 11/1992 | Knowlton |
| 5,355,447 A | 10/1994 | Knowlton |
| 5,379,057 A | 1/1995 | Clough et al. |
| 5,444,763 A * | 8/1995 | Lazaridis et al. ........... 455/403 |
| 5,534,893 A | 7/1996 | Hansen, Jr. et al. |
| 5,546,524 A | 8/1996 | Chow et al. |
| 5,546,538 A | 8/1996 | Cobbley et al. |

(Continued)

FOREIGN PATENT DOCUMENTS

EP 0 833 260 1/1998

(Continued)

OTHER PUBLICATIONS

International Search Report, PCT/CA 03/01840, 3 pages, 2004.

(Continued)

*Primary Examiner*—Cao (Kevin) Nguyen
(74) *Attorney, Agent, or Firm*—Blakely, Sokoloff, Taylor & Zafman LLP

(57) ABSTRACT

The invention discloses a portable device that is similar to a combination of a palm top computer and a cellular telephone, and which allows the user to access the Internet and World Wide Web. A host computer that may also be a Web server, is connected to the Internet and comprises various software programs to translate, rasterize and compress images received from the Internet. The compressed images are sent the portable device and the device is capable of decompressing the compressed image. Thus, the user views a bit map image of a Web page. The portable device further comprises methods of pointing and clicking on text and images which represent links to other pages. All commands that the user enters into the portable device are sent to the host computer, which performs the commands via a virtual browser, and sends the information back to the portable device.

47 Claims, 4 Drawing Sheets

U.S. PATENT DOCUMENTS

| | | | | |
|---|---|---|---|---|
| 5,555,241 | A | 9/1996 | Lazaridis et al. | |
| 5,559,800 | A | 9/1996 | Mousseau et al. | |
| 5,581,243 | A | 12/1996 | Ouellette et al. | |
| 5,600,790 | A | 2/1997 | Barnstijn et al. | |
| 5,657,345 | A | 8/1997 | Lazaridis | |
| 5,682,525 | A | 10/1997 | Bouve et al. | |
| 5,699,255 | A | 12/1997 | Ellis et al. | |
| 5,701,451 | A | 12/1997 | Rogers et al. | |
| 5,721,908 | A | 2/1998 | Lagarde et al. | |
| 5,727,159 | A | 3/1998 | Kikinis | |
| 5,758,110 | A | 5/1998 | Boss et al. | |
| 5,761,663 | A | 6/1998 | Lagarde et al. | |
| 5,764,235 | A | 6/1998 | Hunt et al. | |
| 5,765,176 | A | 6/1998 | Bloomberg | |
| 5,768,483 | A | 6/1998 | Maniwa et al. | |
| 5,778,092 | A | 7/1998 | MacLeod et al. | |
| 5,793,964 | A | 8/1998 | Rogers et al. | |
| 5,802,312 | A | 9/1998 | Lazaridis et al. | |
| 5,809,415 | A | 9/1998 | Rossmann | |
| 5,810,680 | A | 9/1998 | Lobb et al. | |
| 5,831,679 | A | 11/1998 | Montgomery et al. | |
| 5,838,906 | A | 11/1998 | Doyle et al. | |
| 5,845,076 | A | 12/1998 | Arakawa | |
| 5,856,827 | A | 1/1999 | Sudo | |
| 5,862,348 | A | 1/1999 | Pedersen | |
| 5,867,662 | A | 2/1999 | Riggs | |
| 5,867,821 | A | 2/1999 | Ballantyne et al. | |
| 5,884,014 | A | 3/1999 | Huttenlocher et al. | |
| 5,884,056 | A | 3/1999 | Steele | |
| 5,893,095 | A | 4/1999 | Jain et al. | |
| 5,910,805 | A | 6/1999 | Hickey et al. | |
| 5,915,250 | A | 6/1999 | Jain et al. | |
| 5,923,736 | A | 7/1999 | Shachar | |
| 5,925,103 | A | 7/1999 | Magallanes et al. | |
| 5,928,324 | A | 7/1999 | Sloan | |
| 5,938,737 | A | 8/1999 | Smallcomb et al. | |
| 5,949,412 | A | 9/1999 | Huntsman | |
| 5,949,875 | A | 9/1999 | Walker et al. | |
| 5,956,716 | A | 9/1999 | Kenner et al. | |
| 5,961,586 | A | 10/1999 | Pedersen | |
| 5,961,603 | A | 10/1999 | Kunkel et al. | |
| 5,966,135 | A | 10/1999 | Roy et al. | |
| 5,974,441 | A | 10/1999 | Rogers et al. | |
| 5,978,835 | A | 11/1999 | Ludwig et al. | |
| 5,987,256 | A | 11/1999 | Wu et al. | |
| 5,995,102 | A | 11/1999 | Rosen et al. | |
| 5,995,105 | A | 11/1999 | Reber et al. | |
| 6,003,065 | A | 12/1999 | Yan et al. | |
| 6,006,105 | A * | 12/1999 | Rostoker et al. | 455/552 |
| 6,006,231 | A | 12/1999 | Popa | |
| 6,006,241 | A | 12/1999 | Purnaveja et al. | |
| 6,008,836 | A | 12/1999 | Bruck et al. | |
| 6,011,546 | A | 1/2000 | Bertram | |
| 6,011,905 | A | 1/2000 | Huttenlocher et al. | |
| 6,012,083 | A | 1/2000 | Savitzky et al. | |
| 6,012,086 | A | 1/2000 | Lowell | |
| 6,014,133 | A | 1/2000 | Yamakado et al. | |
| 6,014,694 | A | 1/2000 | Aharoni et al. | |
| 6,014,706 | A | 1/2000 | Cannon et al. | |
| 6,016,535 | A | 1/2000 | Krantz et al. | |
| 6,021,409 | A | 2/2000 | Burrows | |
| 6,023,749 | A | 2/2000 | Richardson | |
| 6,026,435 | A | 2/2000 | Enomoto et al. | |
| 6,034,686 | A | 3/2000 | Lamb et al. | |
| 6,035,281 | A | 3/2000 | Crosskey et al. | |
| 6,047,047 | A | 4/2000 | Aldridge et al. | |
| 6,049,539 | A | 4/2000 | Lee et al. | |
| 6,049,821 | A | 4/2000 | Theriault et al. | |
| 6,049,831 | A | 4/2000 | Gardell et al. | |
| 6,052,130 | A | 4/2000 | Bardon et al. | |
| 6,054,985 | A | 4/2000 | Morgan et al. | |
| 6,057,857 | A | 5/2000 | Bloomfield | |
| 6,065,057 | A | 5/2000 | Rosen et al. | |
| 6,065,800 | A | 5/2000 | Olson | |
| 6,067,571 | A | 5/2000 | Igarashi et al. | |
| 6,072,483 | A | 6/2000 | Rosin et al. | |
| 6,072,598 | A | 6/2000 | Tso | |
| 6,073,168 | A | 6/2000 | Mighdoll et al. | |
| 6,073,483 | A | 6/2000 | Nitecki et al. | |
| 6,081,623 | A | 6/2000 | Bloomfield et al. | |
| 6,084,584 | A | 7/2000 | Nahi et al. | |
| 6,087,952 | A | 7/2000 | Prabhakaran | |
| 6,092,107 | A | 7/2000 | Eleftheriadis et al. | |
| 6,097,352 | A | 8/2000 | Zavracky et al. | |
| 6,101,180 | A | 8/2000 | Donahue et al. | |
| 6,104,392 | A | 8/2000 | Shaw et al. | |
| 6,105,021 | A | 8/2000 | Berstis | |
| 6,108,655 | A | 8/2000 | Schleimer et al. | |
| 6,108,727 | A | 8/2000 | Boals et al. | |
| 6,118,449 | A | 9/2000 | Rosen et al. | |
| 6,118,899 | A | 9/2000 | Bloomfield et al. | |
| 6,119,135 | A | 9/2000 | Helfman | |
| 6,121,970 | A | 9/2000 | Guedalia | |
| 6,125,209 | A | 9/2000 | Dorricott | |
| 6,138,156 | A | 10/2000 | Fletcher et al. | |
| 6,157,935 | A | 12/2000 | Tran et al. | |
| 6,182,054 | B1 | 1/2001 | Dickinson et al. | |
| 6,182,127 | B1 | 1/2001 | Cronin, III et al. | |
| 6,185,625 | B1 * | 2/2001 | Tso et al. | 709/247 |
| 6,192,393 | B1 | 2/2001 | Tarantino et al. | |
| 6,195,667 | B1 * | 2/2001 | Duga et al. | 707/513 |
| 6,201,611 | B1 | 3/2001 | Carter et al. | |
| 6,219,465 | B1 | 4/2001 | Nacman et al. | |
| 6,226,400 | B1 | 5/2001 | Doll | |
| 6,233,541 | B1 | 5/2001 | Butts et al. | |
| 6,243,761 | B1 | 6/2001 | Mogul et al. | |
| 6,256,750 | B1 | 7/2001 | Takeda | |
| 6,262,732 | B1 | 7/2001 | Coleman et al. | |
| 6,263,347 | B1 | 7/2001 | Kobayashi et al. | |
| 6,269,481 | B1 | 7/2001 | Perlman et al. | |
| 6,272,332 | B1 | 8/2001 | Matsumoto et al. | |
| 6,282,294 | B1 | 8/2001 | Deo et al. | |
| 6,285,461 | B1 | 9/2001 | Fujii et al. | |
| 6,286,003 | B1 | 9/2001 | Muta | |
| 6,295,059 | B1 | 9/2001 | Lentz et al. | |
| 6,298,162 | B1 | 10/2001 | Sutha et al. | |
| 6,304,928 | B1 | 10/2001 | Mairs et al. | |
| 6,313,880 | B1 | 11/2001 | Smyers et al. | |
| 6,317,781 | B1 * | 11/2001 | De Boor et al. | 709/217 |
| 6,345,279 | B1 | 2/2002 | Li et al. | |
| 6,356,283 | B1 | 3/2002 | Guedalia | |
| 6,359,603 | B1 | 3/2002 | Zwern | |
| 6,404,416 | B1 | 6/2002 | Kahn et al. | |
| 6,411,275 | B1 | 6/2002 | Hedberg | |
| 6,418,310 | B1 | 7/2002 | Dent | |
| 6,421,716 | B1 | 7/2002 | Eldridge et al. | |
| 6,424,369 | B1 | 7/2002 | Adair | |
| 6,433,801 | B1 | 8/2002 | Moon et al. | |
| 6,449,639 | B1 | 9/2002 | Blumberg | |
| 6,466,198 | B1 | 10/2002 | Feinstein | |
| 6,473,097 | B1 | 10/2002 | Elliott | |
| 6,477,143 | B1 | 11/2002 | Ginossar | |
| 6,480,710 | B1 | 11/2002 | Laybourn et al. | |
| 6,487,597 | B1 | 11/2002 | Horie et al. | |
| 6,535,743 | B1 * | 3/2003 | Kennedy, III et al. | 455/456 |
| 6,536,043 | B1 | 3/2003 | Guedalia | |
| 6,539,077 | B1 | 3/2003 | Ranalli et al. | |
| 6,544,295 | B1 | 4/2003 | Bodnar | |
| 6,553,240 | B1 | 4/2003 | Dervarics | |
| 6,553,412 | B1 | 4/2003 | Kloba et al. | |
| 6,560,621 | B2 | 5/2003 | Barile | |
| 6,564,250 | B1 | 5/2003 | Nguyen | |
| 6,565,611 | B1 | 5/2003 | Wilcox et al. | |
| 6,571,245 | B2 | 5/2003 | Huang et al. | |

| | | | |
|---|---|---|---|
| 6,574,501 | B2 | 6/2003 | Lambert et al. |
| 6,598,087 | B1 | 7/2003 | Dixon, III et al. |
| 6,603,469 | B1 | 8/2003 | Gettemy et al. |
| 6,615,234 | B1 | 9/2003 | Adamske et al. |
| 6,628,243 | B1 | 9/2003 | Lyons et al. |
| 6,631,247 | B1 | 10/2003 | Motoyama et al. |
| 6,633,314 | B1 | 10/2003 | Tuli |
| 6,646,759 | B1 | 11/2003 | Koga |
| 6,674,445 | B1 | 1/2004 | Chithambaram et al. |
| 6,677,965 | B1 | 1/2004 | Ullmann et al. |
| 6,690,403 | B1 | 2/2004 | Tuli |
| 6,704,024 | B2 | 3/2004 | Robotham et al. |
| 2001/0032254 | A1 | 10/2001 | Hawkins |
| 2001/0034770 | A1 | 10/2001 | O'Brien |
| 2001/0047441 | A1 | 11/2001 | Robertson |
| 2001/0052911 | A1 | 12/2001 | Boyle et al. |
| 2002/0015042 | A1 | 2/2002 | Robotham |
| 2002/0018234 | A1 | 2/2002 | Fu |
| 2002/0030843 | A1 | 3/2002 | Tuli |
| 2002/0030844 | A1 | 3/2002 | Tuli |
| 2003/0074672 | A1 | 4/2003 | Daniels |

FOREIGN PATENT DOCUMENTS

| | | |
|---|---|---|
| EP | 0 889 402 A | 1/1999 |
| EP | 0 889 636 A | 1/1999 |
| EP | 890922 A2 | 1/1999 |
| EP | 1 001 613 A | 5/2000 |
| EP | 1026578 A2 | 8/2000 |
| EP | 1043876 A2 | 10/2000 |
| EP | 1109113 A2 | 6/2001 |
| GB | 2347766 A | 9/2000 |
| WO | WO 97 30556 A | 8/1997 |
| WO | WO 97 38389 A | 10/1997 |
| WO | WO 98 40842 A | 9/1998 |
| WO | WO 98 43177 A | 10/1998 |
| WO | WO 99 09658 A | 2/1999 |
| WO | WO 99/48007 | 9/1999 |
| WO | WO 00/18054 A | 3/2000 |
| WO | WO 0033232 A2 | 6/2000 |
| WO | WO 01 09836 A | 2/2001 |
| WO | WO 02/08878 A | 1/2002 |
| WO | WO 02/057951 A | 7/2002 |

OTHER PUBLICATIONS

Rumba Technical Bulletin, "Configuring RUMBA LPR & LPD (16-bit)," 1996, from the web: 156.27.8.200/ts_rumba/solution/pdf/TCPIP/4002.pdf, pp.1-11.

International Search Report, PCT/CA 02/00133, 3 pages, 2003.

International Search Report, PCT/CA 02/00048, 3 pages, 2003.

International Search Report, PCT/CA 01/01057, 2 pages, 2003.

Joel F. Bartlett, "Experience with a Wireless World Wide Web Client", Mar. 1995.

Tristan Richardson, Quentin Stafford-Fraser, Kenneth R. Wood & Andy Hopper, "Virtual Network Computing", *IEEE Internet Computing*, vol. 2 No. 1, Jan./Feb. 1998 pp. 33-38.

Citrix Systems, Inc.: "Citrix Announces New Product amd Product Enhancements that Speed Web Application", http://www.citrix.com/press/news/releases/20000905_product_enhance.asp, Sep. 5, 2000.

International Search Report, PCT/US 01/03382, 1 pages, 2001.

International Search Report, PCT/CA 01/00114, 3 pages, 2001.

International Search Report, PCT/CA 01/00126, 3 pages, 2001.

International Search Report, PCT/CA 01/00170, 4 pages, 2002.

International Search Report, PCT/CA 01/00169, 3 pages, 2002.

International Search Report, PCT/CA 02/00048, 5 pages, 2003.

Tagawa Norio, "Data Relay System and Data Repeater Applied to the System", Patent Abstracts of Japan, vol. 1997, No. 10, Jun. 24, 1997.

Armando Fox et al, "Experience with Top Gun Wingman: a proxy-based graphical web browser fro the 3Com PalmPilot", *Middleware*, IFIP International Conference on Distributed Systems, Platforms and Open Distributed Processing, Sep. 1998, pp. 407-424.

Richard Han, et al., "Dynamic Adaptation in an Image Transcoding Proxy for Mobile Web Browsing ", *IEEE Personal Communication*, Dec. 1998, pp. 8-17.

Timothy Bickmore, et al., "Web Page Filtering and Re-Authoring for Mobile Users", *The Computer Journal*, vol. 42, No. 6, 1999.

Boutell, T. et al., "PNG (Portable Network Graphics) Specification Version 1.0", RFC 2083, pp. 1-102, Mar. 1997.

Halfhill, T.R., "Good-Bye GUI . . . Hello, NUI," BYTE Magazine, www.byte.com, vol. 22, No. 7, pp. 60-64, 66, 68, 70, and 72, Jul. 1997.

Masinter, L., "Returning Values from Forms: multipart/form-data," RFC 2388, pp. 1-9, Aug. 1998.

Jao, C.S. et al., "The display of photographic-quality images on the Web: a comparison of two technologies," IEEE Transactions on Information Technology In Biomediciene, vol. 3, iss. 1, pp. 70-73, Mar. 1999.

Kaljuvee, O. et al., "Efficient Web form entry on PDAs," ACM Proceedings of the tenth International Conference on WWW, ACM Press, ISBN: 1-58113-348-0, pp. 663-672, May 2001.

Oliphant, Malcolm W. "The Mobile Phone Meets the Internet", *IEEE Spectrum*, vol. 36, Issue 8, Aug. 1999, pp. 20-28.

Lind, R., et al. "The Network Vehicle—A Glimpse into the Future of Mobile Multi-Media", *IEEE ASE Systems Magazine*, Sep. 1999, pp. 27-32.

Gbaguidi, Constant, et al. "A programmable Architecture for the Provision of Hybrid Services", *IEEE communications Magazine*, vol. 27, Issue 7, Jul. 1999, pp. 110-116.

Narayanaswamy, Shankar, et al. "User Interface for a PCS Smart Phone", *IEEE Int.. Conference on Multimedia Computing and Systems*, vol. 1 Jun. 1999, pp. 777-781.

International Search Report, PCT/CA 03/01326, 3 pages, 2004.

Selected pages from AT&T Wireless, Bell Atlantic Mobile, and Nextel, as delivered through the Wayback Machine, web.archieve.org, 2004.

Lewis, Ted. "Information Appliances: Gadget Netopia" *Computer*, vol. 31, issue 1, Jan. 1998, pp. 59-68.

Cimini, Leonard J., Jr., et al. "Advanced Cellular Internet Service (ACIS)", *IEEE communication Magazine*, vol. 36, Issue 10, Oct. 1998, pp. 150-159.

\* cited by examiner

PORTABLE HIGH SPEED INTERNET DEVICE INTEGRATING CELLULAR TELEPHONE AND PALM TOP COMPUTER

The present application is a divisional application of U.S. patent application Ser. No. 09/504,807, filed Feb. 16, 2000 now U.S. Pat. No. 6,633,314, which is a Continuation In Part (CIP) application of U.S. patent application Ser. No. 09/496,172, filed Feb. 2, 2000 now U.S. Pat. No. 7,068,381.

PRIOR ART

The background of the present invention includes U.S. Pat. No. 5,925,103, Internet Access Device, which describes an improved Internet access system, vastly different from the present invention. Other prior art would include palm top computers, hand-held computers and cellular telephones that have limited processing power due to design restrictions. Thus, these computers are much slower for accessing the Internet and World Wide Web.

The present invention enhances the server's processing speed, data transfer and retrieval to and from the portable devices, with the aid of specialized embedded software in the server. The result is a cost effective Internet access solution.

SUMMARY

It is an object of the present invention to disclose a portable device, similar to a combination of a cellular telephone and palm top computer, that can access the Internet and World Wide Web, at extremely low costs. It is another object of the present invention to provide fast access to the Internet such that refreshing pages is quick and efficient.

The principal embodiment of the present invention discloses a portable device that comprises a modem that connects to a cellular telephone. Thus, the device has a wireless connection to the Internet. A host computer, which may also be a Web server connects directly to the Internet. The host computer comprises multiple software programs, for example a Browser Translator, which translates HTML images into black and white bit map or raster images. The compressed bit map or raster images are sent to the portable device, and the device decompresses the images. Thus, the user views a bit map image of a Web page.

The portable device comprises methods for pointing and clicking on text and images representing links to other Web pages. Clicking events are sent to the host computer that performs the commands via a virtual browser. The host computer then sends the required information to the portable device as a compressed image. The portable device decompresses the image and the user views a new page.

In a further embodiment, the server may also send a message to the device containing information pertaining to locations of links. Icons, graphics, or text that are already in bold, and which represent links to other Web sites must be conveyed to the user but it is difficult to represent such items in bold on the device. Thus, the server may transmit a message to the device containing the specification of all the areas that would constitute a link on the page so that the palm top device would know where a link exists. Therefore, when a user passes the cursor over that area the cursor changes from an arrow to a hand. The user recognizes that the icon is a link and may therefore click upon it.

In another embodiment, the process of capturing the raster image, reducing it to black and white, sending it to the device and displaying it on the screen of the device, is done over the standard wireless mark up language or WAP protocols.

DETAILED DESCRIPTION OF THE DRAWINGS

DETAILED DESCRIPTION OF THE PRESENT INVENTION

The principal embodiment of the present invention aims to provide a device that allows a user to access the Internet or the World Wide Web (WWW), which device is similar to a combination of a palm top computer and a cellular phone. The device is a cellular type phone (or a wireless phone) which also contains a screen for the user to view contents of a web page all integrated into one portable device. It is a further aim of the present invention, to reduce the cost of the device. It is a further aim of the present invention, is to increase the speed of refreshing the screen when the user clicks on a link and commands another page to be displayed.

Currently, existing palm top devices such as the Palm Pilot VII and Windows CE type devices contain an operating system, and within the operating system a mini-browser to interpret information received from the WWW or Internet and then display this information on the screen. This requires a powerful microprocessor. This is similar to cellular phones except the cellular phones have lesser expensive microprocessors but can only usually display some key words such as over a WAP type protocol or wireless markup language.

Figure 1:
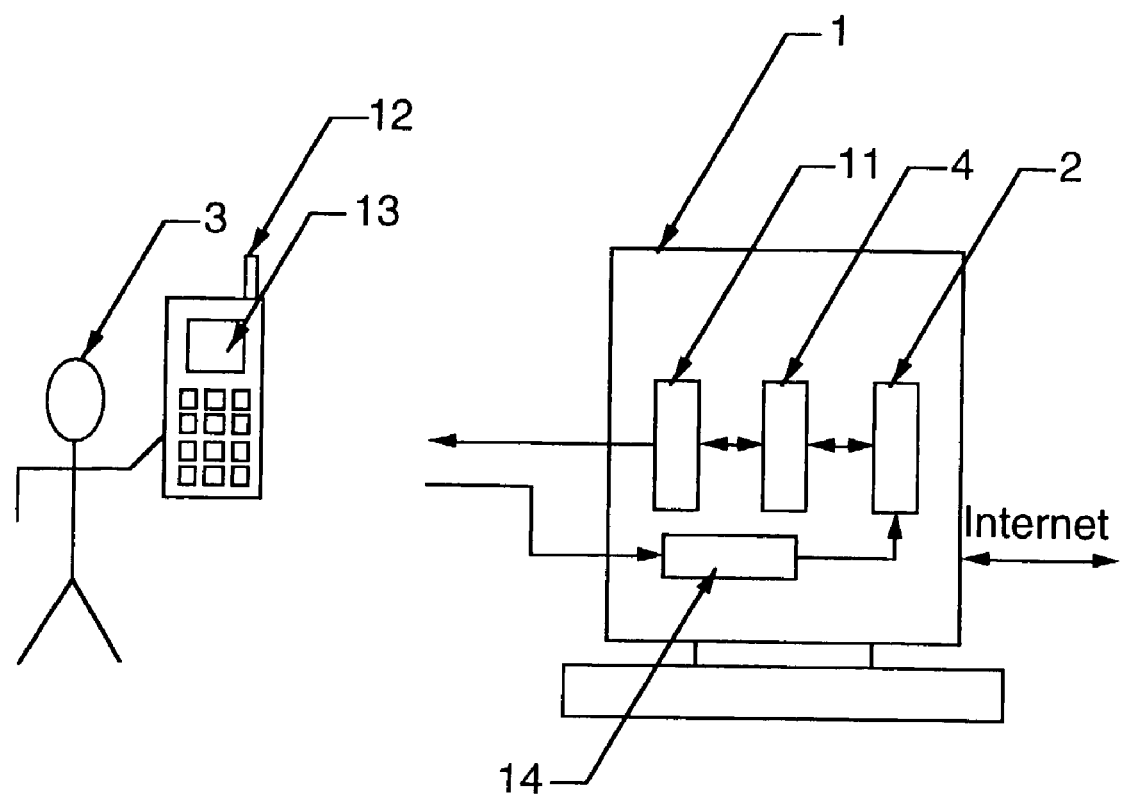
FIG. 1 illustrates a block diagram of the host computer, the portable device with wireless connection and the user.
Figure 2:
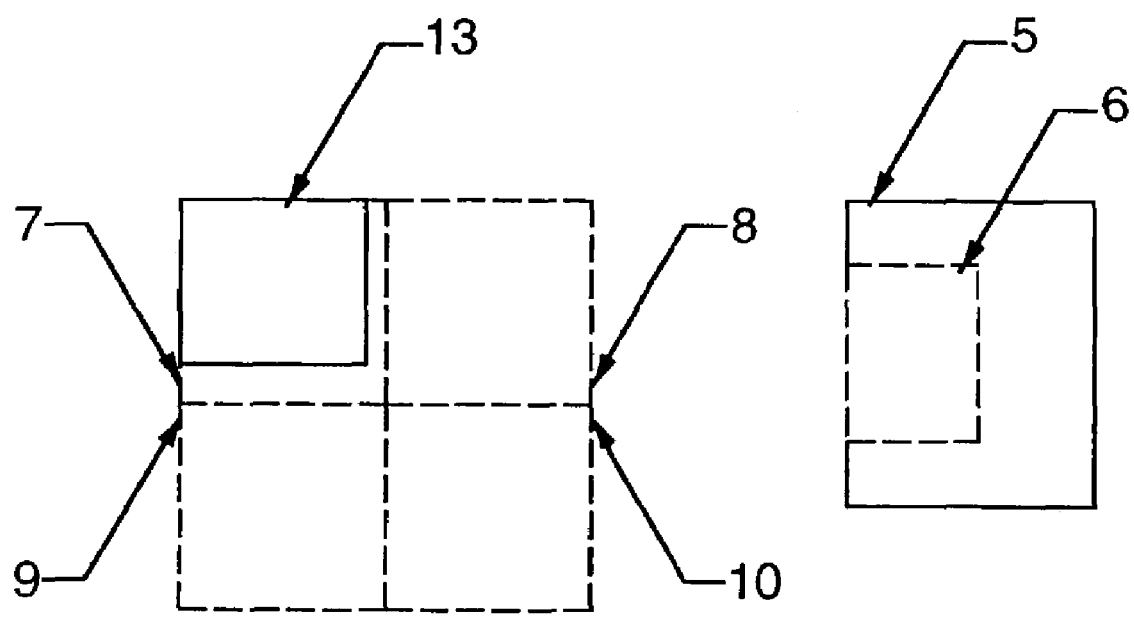
FIG. 2 illustrates portions of the image with respect to the displayable area.

The principal embodiment of the present invention is disclosed in FIG. 1. A host computer 1 is depicted that is connected to the Internet and may also be a Web server. Running in the host computer, is a Web server program 2. When a remote user 3 requests to view a Web page (or electronic message etc.) the Web server software receives HTML, JAVA, etc. information and transmits this information to another software, the Browser Translator 4. This software translates the information, (i.e. the entire image comprising graphics and text) received in the form of HTML, Java, etc. (information may be gathered from different sources) and translates it to a black and white bit map or raster image. In another embodiment, the software translates the information into a raster or color image. The image 5, as shown in FIG. 2, contains the information that would normally be displayed on a single Web page. The translation program therefore, also acts as a virtual browser 6. As can be seen in FIG. 2, the image 5 to be displayed in a browser window 6 is usually larger than the displayable area of the browser window 6.

Figure 3:
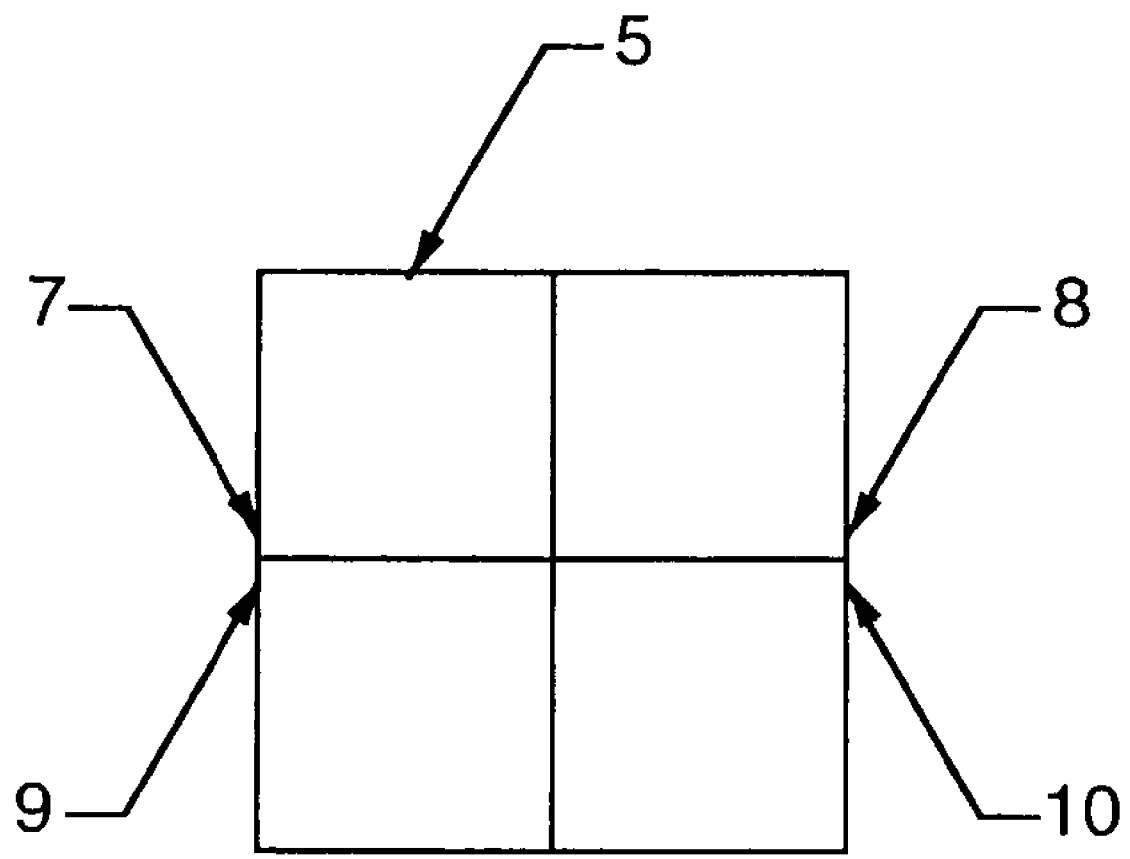
FIG. 3 illustrates sub-divisions of the image to be displayed.

The image 5 is further divided into sections 7, 8, 9, and 10, as shown in FIG. 3. The image is divided after the bitmap or raster is created. The reason for the division (as will be explained later) is for the purpose of display priority on the user's display. The image is then sent to another program 11 running on the host computer 1 (FIG. 1), which compresses the image using a loss-less compression method. The compression method may be group 3 or group 4, or another method.

The programs 4 and 11 can have multiple instances running simultaneously on the host server for the purpose of connecting to multiple users. The compressed image, after being processed by program 11, is sent to the user, using a protocol in which information may be broken down into packets.

The information is received by a palm top phone device 12 that has the ability to display a monochrome image, in its display window 13. The information is decompressed and displayed in the order of priority such that part of image 7, which substantially or completely covers the displayable area 13 (FIG. 2), of the palm device is decompressed and displayed first and then sequentially the portions 8, 9, 10 of the image are decompressed and stored in an internal memory of the palm top device to be displayed later when the user scrolls up, down, or sideways to these parts of the image. So the parts of the image that are not immediately displayed are received and decoded in sequence of priority of which image the user may want to see next.

A CPU resident in the palm top phone device therefore has the ability to decompress a bit map or raster image that may be larger than the size of the display and allow the user to traverse this bit map or raster image. The primary method of traversing the image is through conventional scroll bars positioned at the sides of the image.

The resident CPU on the palm top phone device has no ability to determine which parts part or parts of the image, that is being displayed, represent links to other Web pages etc. Thus, the translator program 4 (FIG. 1) translates the image in the virtual browser 6 such that the words that represent links on the page 5 (FIG. 2) are translated to be slightly bolder. The user may therefore consider text that is bold to be links.

The palm top phone device provides the user with a pointing device. This pointing device may be a touch screen or tracking ball, etc. The palm top phone device also allows the user to click on specified areas. As soon as the user clicks on part of an image, the shape of the pointer changes from an arrow to an hourglass. A message is sent to the host computer, transmitting the location of the clicked down event. A program 14 interprets the message and provides a virtual click down in the virtual browser created in the translator program 4. If the user has pressed in an area of the image that does not represent a link or text box, a message is dispatched to the palm top phone device which immediately changes the hourglass shape of the pointer back to an arrow (in the case of a touch screen, from an hour glass to nothing). Further to this, if the user has clicked on a part of the image which represents a link, a new Web page is extracted from the Internet or WWW, translated by translator program 4 (FIG. 1) into a bit map or raster, and compressed by compression program 11 and dispatched to the palm top device where a new page is displayed. In a further embodiment, the image may be continuously being updated and translated and sent to the palm top phone device where it is continuously being refreshed. This occurs once every few seconds. In the principle embodiment therefore, the server only responds, i.e. it only refreshes the screen when the user clicks on a link or on a text box.

A

In a further embodiment, the server may also send a message to the device containing information pertaining to locations of links. For example, icons, graphics, or text that is already in bold, representing links to other Web sites must be conveyed to the user but it is difficult to represent such items in bold on the device. Thus, the server may transmit a message to the device containing the specification of all the areas that would constitute a link on the page so that the palm top phone device would know where a link exists. So when a user passes the cursor over that area the cursor changes from an arrow to a hand. The user recognizes that the icon is a link and may therefore click upon it. The cursor changes to an hourglass and a message is sent to the server transmitting the location of the clicked down event. A program 14 interprets the message and provides a virtual click down in the virtual browser created in the translator program 4. A new Web page is extracted from the Internet or WWW, translated by translator program 4 (FIG. 1) into a bit map or raster, and compressed by compression program 11 and dispatched to the palm top phone device where a new page is displayed.

When the user clicks in a text box or in a box in the display area into which letters or numbers must be input, the cursor first changes into an hourglass, and a message is sent to the host server. The host server recognizes that the click down event has occurred in the text box, and sends a message back to the palm top device to inform the palm top device to pop-up a keyboard on part of the screen. The user then types, using the pointer, the letters or words to be entered into the text box and presses "enter" or "go". The keyboard then disappears and the cursor changes back to an hourglass shape (in another embodiment, the keyboard could be replaced with a real keyboard or with an area that recognizes users' handwriting). In a further embodiment, the user may use the keyboard of the phone device that is already provided for the purpose of dialing his/her phone numbers. The alphanumeric information would then be typed in a similar fashion as it is typed for speed dial numbers on these phones currently. The information typed into the text box is transmitted in a message to the host computer. The host computer enters the information into a text box in the virtual browser. The user sees, after a short pause, as the image is refreshed on the palm top device, that the words, or letters or numbers have been entered into the text box. Further to this, the host computer may also break up the image such that the portion that has been changed, i.e. the text box area, is sent first.

In another embodiment of the present invention, images are only refreshed when as event occurs such as a mouse down event on a link or in a text box.

In a further embodiment only those portions of the image that changes may be transmitted from the host computer to the palm top phone device. Other images in the virtual browser that are continuously changing, such as banner advertisements, may be the only other images sent to the palm top computer as they change.

In a further embodiment, the server may also send a message to the palm top phone device, together with the raster black and white image and the message containing the link areas, a message containing the location and area of the text boxes. In this case when the user clicks in a text box, the device realizes that the user intends to input text and provides him with a keyboard on the screen (or other means disclosed earlier). After the user enters the text, the message is sent to the server in the normal fashion described earlier.

In the principal embodiment, the palm top phone device sends the information and messages through the phone's wireless connection.

Furthermore, the palm top device only contains enough memory to store the current displayable page. When the user presses a back or forward button, a message is sent to the host server, and the host server sends the reference page. The back and forward buttons etc. may be hard wired into the palm top phone device, or may be part of the display area.

Further to this, part of the image representing buttons (and other things) on the virtual browser may be sent as part of the compressed image and buttons such as forward and back may be treated the same way as links are handled as previously described. In the principle embodiment therefore the back and forward buttons are hard coded as part of the device.

In a further embodiment, the palm top device may contain a large screen to be used in a fashion similar to a home Internet appliance.

In a further embodiment, the image transferred between the host computer and the remote device (previously the palm top device) may be a color image and the compression method used may be of a Jpeg or other compression methods used for color images. A gray scale image may also be used to reduce bandwidth or display costs.

In a further embodiment, the device includes no screen, but only outputs to be hooked to a television screen or external monitor for display.

The remote device in the principal embodiment only has the ability to decompress the image it receives; display the image it receives; allow the user to scroll through the image; provide the user with a pointing device to point and click on the image; send messages providing location of click down event; provide the user with a method to input letters and numbers; send a message containing these letters and numbers.

The principal embodiment contains no other structured or intelligent information about the image.

Figure 4:
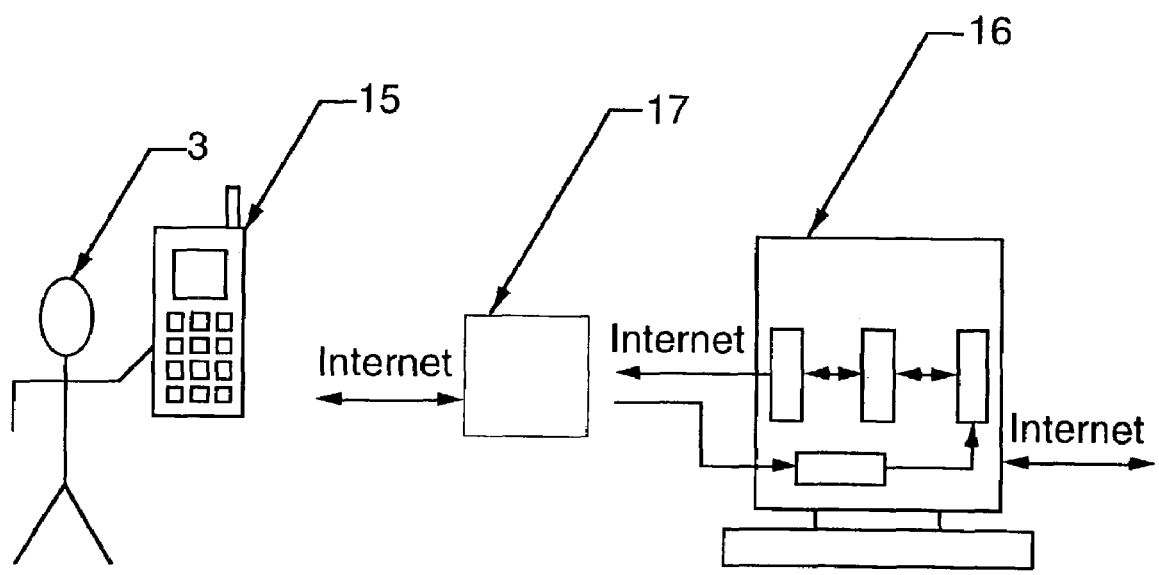
FIG. 4 illustrates the portable device, the direct server and the host server.

In another embodiment, this entire process of capturing the raster image, reducing it to black and white, sending it over to the device and showing it on the screen of the device could be done over the standard wireless mark up language or WAP protocols, as illustrated in FIG. 4.

A standard cellular telephone 15 with a standard protocol such as wireless mark up language or WAP, no matter which Web page it wants to view will always try to log on the host server. The host server 16 in this case, is not in direct contact with the device, but acts like a standard Web server that serves Web pages. The device makes contact with the Internet through its standard wireless connections and possibly to a server called the direct server 17. When the device wants to log onto any Web page, it always first sends the address for the host server 16 and then communicates to the host server of the actual Web page it wants to see. The host server then pulls that particular Web page from the Internet, rasterizes it, converts it to black and white, compresses the image and encloses it in the standard protocol, such as wireless mark up language or WAP or HTML.

The device therefore, through the Internet is communicating only, or is logged onto only, the Web page of the host server.

The host server takes the actual page from the Internet and rasterizes it and sends it.

In this case, any standard telephone that has Internet access using one of the standard protocols can be used that has the ability to show a graphic image.

What is claimed:

1. A computer implemented method to serve a document to a remote device, the method comprising:
   receiving at a server a request from the remote device for a document which represents a web page having links;
   rendering the entire document into an image;
   dividing the image into a plurality of sections;
   compressing the plurality of sections into a plurality of compressed sections respectively; and
   transmitting the plurality of compressed sections to the remote device in a sequence according to a display priority.

2. A computer implemented method as in claim 1 wherein a first section of the plurality of sections substantially covers a display area of the remote device.

3. A computer implemented method as in claim 1 wherein the image is a black and white bitmap; and, the document has more than two colors.

4. A computer implemented method as in claim 3 wherein the plurality of compressed sections are transmitted to the remote device in one of:
   a) a wireless mark up language; and
   b) WAP.

5. A computer implemented method as in claim 1 further comprising:
   receiving a message from the remote device, the message indicating that a user input is provided to the document;
   applying the user input to the document.

6. A computer implemented method as in claim 5 wherein the message indicates that a link of the document is clicked; and said applying comprises:
   retrieving a linked document pointed at by the link to serve the linked document to the remote device.

7. A computer implemented method as in claim 1 wherein the document has first displayable information in a non-image format; and, the image includes the first displayable information.

8. A computer implemented method as in claim 1 wherein said rendering comprises:
   reducing a color depth to generate the compressed image from the document.

9. A computer implemented method as in claim 8 wherein the compressed image is a black and white image reduced from the document.

10. A computer implemented method as in claim 1 wherein the document is retrieved by the server from a remote server.

11. A computer implemented method as in claim 1 wherein the plurality of compressed sections are transmitted to the remote device through a wireless telecommunication link.

12. A computer implemented method as in claim 1 further comprising:
    sending location information to the remote device, the location information specifying in the image at least one location at which a user input can be accepted at the remote device for an operation at the server with respect to the document.

13. A computer implemented method as in claim 12 wherein the at least one location comprises a location of one of:
    a) a link to a document; and
    b) a text box.

14. A computer implemented method to serve a document for displaying on a remote device, the computer implemented method comprising:
    receiving at a server a request for a document from the remote device, the document having first displayable information in a non-image format;
    rendering the document into an image, a portion of the image being rendered from the first displayable information, the image being larger than a display area of the remote device;
    compressing the image into a compressed image; and
    causing a wireless transmission of the compressed image to the remote device.

15. A computer implemented method as in claim 14 wherein the remove device is capable of scrolling an image decompressed from the compressed image for displaying in the display area of the remote device.

16. A computer implemented method as in claim 14 wherein the first displayable information comprises at least one of:
   a) text; and
   b) Java.

17. A computer implemented method as in claim 16 wherein the document further has at least one of:
   a) icons;
   b) graphics; and
   c) text box.

18. A computer implemented method as in claim 14 wherein the compressed image is transmitted to the remote device through a wireless telecommunication link.

19. A computer implemented method as in claim 18 wherein the compressed image is transmitted to the remote device in one of:
   a) a wireless mark up language; and
   b) WAP.

20. A computer implemented method as in claim 18 further comprising:
   sending location information to the remote device, the location information specifying in the image at least one location at which a user input can be accepted at the remote device for an operation at the server with respect to the document.

21. A method as in claim 20 wherein the at least one location comprises a location of one of:
   a) a link to a document; and
   b) a text box.

22. A machine readable medium containing executable computer program instructions which when executed by a data processing system cause said system to perform a computer implemented method to serve a document to a remote device, the computer implemented method comprising:
   receiving at a server a request from the remote device for a document which represents a web page having links;
   rendering the entire document into an image;
   dividing the image into a plurality of sections;
   compressing the plurality of sections into a plurality of compressed sections respectively; and
   transmitting the plurality of compressed sections to the remote device in a sequence according to a display priority.

23. A medium as in claim 22 wherein a first section of the plurality of sections substantially covers a display area of the remote device.

24. A medium as in claim 22 wherein the image is a black and white bitmap; and, the document has more than two colors.

25. A medium as in claim 24 wherein the plurality of compressed sections are transmitted to the remote device in one of:
   a) a wireless mark up language; and
   b) WAP.

26. A medium as in claim 22 wherein the method further comprises:
   receiving a message from the remote device, the message indicating that a user input is provided to the document;
   applying the user input to the document.

27. A medium as in claim 26 wherein the message indicates that a link of the document is clicked; and said applying comprises:
   retrieving a linked document pointed at by the link to serve the linked document to the remote device.

28. A medium as in claim 22 wherein the document has first displayable information in a non-image format; and, the image includes the first displayable information.

29. A medium as in claim 22 wherein said rendering comprises:
   reducing a color depth to generate the compressed image from the document.

30. A medium as in claim 29 wherein the compressed image is a black and white image reduced from the document.

31. A medium as in claim 22 wherein the document is retrieved by the server from a remote server.

32. A medium as in claim 22 wherein the plurality of compressed sections are transmitted to the remote device through a wireless telecommunication link.

33. A medium as in claim 22 wherein the method further comprises:
   sending location information to the remote device, the location information specifying in the image at least one location at which a user input can be accepted at the remote device for an operation at the server with respect to the document.

34. A medium as in claim 33 wherein the at least one location comprises a location of one of:
   a) a link to a document; and
   b) a text box.

35. A data processing system for executing a computer implemented method to serve a document to a remote device, the data processing system comprising:
   means for receiving at a server a request from the remote device for a document which represents a web page having links;
   means for rendering the entire document into an image;
   means for dividing the image into a plurality of sections;
   means for compressing the plurality of sections into a plurality of compressed sections respectively; and
   means for transmitting the plurality of compressed sections to the remote device in a sequence according to a display priority.

36. A data processing system as in claim 35 wherein a first section of the plurality of sections substantially covers a display area of the remote device.

37. A data processing system as in claim 35 wherein the image is a black and white bitmap; and, the document has more than two colors.

38. A data processing system as in claim 37 wherein the plurality of compressed sections are transmitted to the remote device in one of:
   a) a wireless mark up language; and
   b) WAP.

39. A data processing system as in claim 35 further comprising:
   means for receiving a message from the remote device, the message indicating that a user input is provided to the document;
   means for applying the user input to the document.

40. A data processing system as in claim 39 wherein the message indicates that a link of the document is clicked; and said means for applying comprises:
   means for retrieving a linked document pointed at by the link to serve the linked document to the remote device.

41. A data processing system as in claim 35 wherein the document has first displayable information in a non-image format; and, the image includes the first displayable information.

42. A data processing system as in claim 35 wherein said means for rendering comprises:
   means for reducing a color depth to generate the compressed image from the document.

43. A data processing system as in claim 42 wherein the compressed image is a black and white image reduced from the document.

44. A data processing system as in claim 35 wherein the document is retrieved by the server from a remote server.

45. A data processing system as in claim 35 wherein the plurality of compressed sections are transmitted to the remote device through a wireless telecommunication link.

46. A data processing system as in claim 35 further comprising:
   means for sending location information to the remote device, the location information specifying in the image at least one location at which a user input can be accepted at the remote device for an operation at the data processing system with respect to the document.

47. A data processing system as in claim 46 wherein the at least one location comprises a location of one of:
   a) a link to a document; and
   b) a text box.

* * * * *